No. 786,612. PATENTED APR. 4, 1905.
O. R. VAN DOREN.
AUTOMOBILE OR BICYCLE WHEEL.
APPLICATION FILED OCT. 24, 1904.

WITNESSES:      INVENTOR:
Ralph Lancaster      Ogden R. Van Doren,
Russell M. Everett      BY Charles H. Hill,
     ATTORNEY No. 786,612.

Patented April 4, 1905.

UNITED STATES PATENT OFFICE.

OGDEN R. VAN DOREN, OF NEWARK, NEW JERSEY.

AUTOMOBILE OR BICYCLE WHEEL.

SPECIFICATION forming part of Letters Patent No. 786,612, dated April 4, 1905.

Application filed October 24, 1904. Serial No. 229,702.

*To all whom it may concern:*

Be it known that I, OGDEN R. VAN DOREN, a citizen of the United States, residing at Newark, in the county of Essex and State of New Jersey, have invented certain new and useful Improvements in Automobile or Bicycle Wheels; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The objects of this invention are to avoid the inconvenience and loss incident to the puncturing of tires; to provide a simple, durable, and comfortable wheel, and to obtain other advantages and results, some of which may be hereinafter referred to in connection with the description of the working parts.

The invention consists in the improved wheel for automobiles, bicycles, and other vehicles and in the arrangements and combinations of parts of the same, all substantially as will be hereinafter set forth, and finally embraced in the clauses of the claim.

Figure 1:
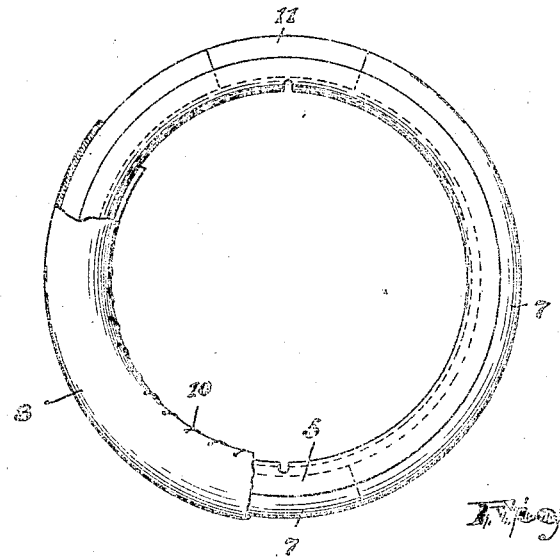
Figure 3:
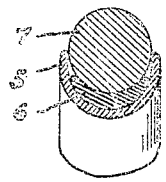
Figures 2, 4:
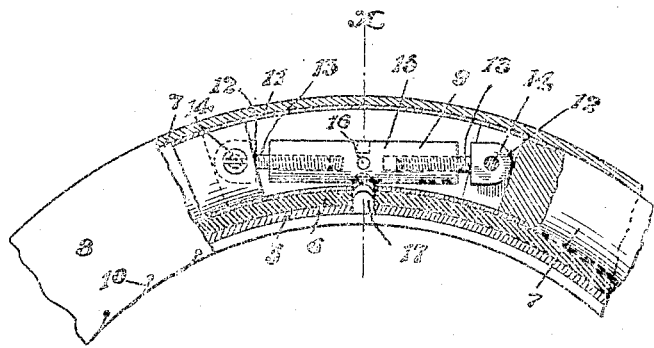

Referring to the accompanying drawings, in which like letters of reference indicate corresponding parts in each of the several figures, Figure 1 is a side elevation of a portion of a wheel of my improved construction, the spokes and hub being omitted and the outer cover or jacket being broken away. Fig. 2 is a view of a portion of the wheel on an enlarged scale, a part being in section taken at the center plane parallel with the opposite sides of the wheel. Fig. 3 is a transverse section taken through the rim cushion and tire, and Fig. 4 is a section taken through line *x* of Fig. 2.

In said drawings, 5 indicates a metal rim, which is outwardly curved at its opposite edges to form an annular groove on its periphery. Within this groove is an annular cushion 6, of rubber, and outside of said rubber cushion is arranged a tire 7, which is preferably in sections and held in said groove by turnbuckles 9. Outside of and around said rim and tire is an elastic cover or jacket 8, which is removably held in place by the lacing-cords 10. The tire-sections are of solid wood and are reduced at their ends to enter curved tubular sleeves 11, the peripheries of the sleeves lying flush with the surfaces of the large parts of the said sections. The ends of said sections are preferably slotted transversely, and in the slots are pivotally arranged the heads 12 of the opposite turnbuckle-screws 13, the said heads being arranged on the transverse pivots 14, which may be screws or otherwise. The center bolt 15 of the turnbuckle is provided with holes or other means 16, whereby it may be turned by a wrench or key, and near said holes the rim, cushion, and sleeve are slotted or perforated to enable said wrench or key to gain access to the said bolt from the outside. The wooden tire-sections are preferably of hickory-wood and are preferably approximate semicircles. Said tire-sections are prevented from moving laterally independent of the rim by engagement with the upwardly-extending sides of the said rim; but the load carried by the wheels is cushioned in its progress, first by the elastic packet or cover 8 and also by the cushion 6 at the bottom of the rim-groove. Thus smoothness of movement is obtained; but all danger of puncturing is avoided. The spokes 16, Fig. 4, and hub (not shown) may be of any ordinary construction.

In assembling the parts constructed as described the cushion, which is preferably a continuous piece of rubber, is sprung into the groove of the rim, the tire-sections are coupled together and by means of the turnbuckles drawn into the sleeves, and the jacket 8 is finally laced over the outside of said tire and rim, when the wheel is ready for service as usual.

Having thus described the invention, what I claim as new is—

1. The combination with the rim grooved at its outer periphery, of an elastic cushion lying at the bottom of the groove, and a wooden tire arranged in said groove on said cushion, said wooden tire being in semicircular sections coupled together at their ends, opposing ends of said sections being held in connecting-sleeves, the opposite sides of said tire-sections and sleeves engaging the side walls of the groove of said rim, substantially as set forth.

2. The combination with the rim grooved at its outer periphery, of an elastic cushion lying at the bottom of the groove, a wooden tire arranged in said groove on said cushion, the ends of said tire being drawn down into said groove against said cushion by a turnbuckle, the latter being connected to the said ends and a sleeve containing the ends of the tire and said turnbuckle, substantially as set forth.

3. The combination with the metallic rim grooved at the outer periphery, of an elastic cushion arranged at the bottom of the groove, and a tire in approximately semicircular sections joined together by turnbuckles, said semicircular sections at their ends being inserted in sleeves interposed between the said tire bearing upon said elastic cushion and held from lateral movement by the sides of the metallic rim and a jacket or covering inclosing said rim and tire, substantially as set forth.

4. The combination with the metallic rim grooved at its outer periphery, of an elastic cushion arranged at the bottom of the groove, and a tire in approximately semicircular sections joined together by turnbuckles, said semicircular sections being reduced at their ends and inserted in curved tubular sleeves interposed between said sections and being slotted to receive the opposite heads of the turnbuckles, the said tire bearing upon said elastic cushion and held from lateral movement by the sides of the metallic rim and a jacket or covering inclosing said rim and tire, substantially as set forth.

In testimony that I claim the foregoing I have hereunto set my hand this 22d day of October, 1904.

OGDEN R. VAN DOREN.

Witnesses:
CHARLES H. PELL,
RUSSELL M. EVERETT.